Patented June 24, 1930

1,766,819

UNITED STATES PATENT OFFICE

ERICH HARTMANN AND MAX HARDTMANN, OF WIESDORF-ON-THE-RHINE, AND PAUL KUMMEL, OF LEVERKUSEN-ON-THE-RHINE, GERMANY, ASSIGNORS TO I. G. FARBENINDUSTRIE AKTIENGESELLSCHAFT, OF FRANKFORT-ON-THE-MAIN, GERMANY

PROCESS FOR PROTECTING WOOL, FUR, RUGS, AND THE LIKE AGAINST THE ATTACK OF MOTHS AND PRODUCT THEREOF

No Drawing. Application filed November 26, 1926, Serial No. 151,008, and in Germany November 27, 1925.

The present invention relates to a process whereby materials liable to the attack of moths can be permanently and completely protected and to the resulting protected materials.

In order to obtain the desired result in accordance with this invention, the materials to be moth-proofed are treated with chemical compounds in which an element of group V of the Mendelejeff classification of the elements, having an atomic weight greater than 14 and more particularly one of the elements phosphorus, arsenic, antimony, and bismuth, in either the trivalent or pentavalent state, is directly linked to carbon atoms of one or several organic radicals which may be either all aliphatic or all aromatic radicals, or part aliphatic radicals and part aromatic radicals, substituted or unsubstituted and either similar or dissimilar. Compounds corresponding to the following formulæ have been found to answer the necessary requirements:—

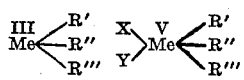

in which $\overset{III}{Me}$ represents trivalent phosphorus, arsenic, antimony, or bismuth; $\overset{V}{Me}$ represents pentavalent phosphorus, arsenic, antimony, or bismuth; R′, R″, R‴ each represent any aliphatic or aromatic radical, as for example: methyl, ethyl, benzyl, phenyl, tolyl, naphthyl, bromophenyl, dimethylaminophenyl, R″ or R‴ or R″ and R‴ can also represent the same or different inorganic or organic acid radicals, e. g., chlorine, acetyl, or a hydroxy group, or two bonds can be saturated by oxygen or sulfur, and X and Y each represent any halogen or any acid radical or a hydroxyl group or together represent oxygen.

The term "inorganic or organic acid radicals" is intended to comprise the radicals of inorganic acids such as sulfuric and hydrochloric acid and of organic acids such as acetic acid. Such radicals are $=SO_4$, $-Cl$, $-OOCCH_3$, or the radical $=CO_3$ of carbonic acid.

Thus for example the following compounds lend themselves for incorporation within the pores of or attachment otherwise to the materials to be rendered immune from attack of moths: arsanilic acid, chlorophenyl arsinic acid, phenylstibinic acid, monophenyl stibine oxide, diphenyl arsine oxide, diphenyl stibine acetate, diphenyl-bismuth bromide, tri-p-tolyl-phosphine, triphenylarsine, tribenzylarsine, tri-dimethyl-aminophenylarsine, triphenylarsine dihydroxide, triphenylstibine, tri-p-tolystibine, tri-o-tolylstibine, diphenyl-ethylstibine, tribromo phenylstibine, trimethylstibine dibromide, trimethylstibinedichloride, triethylstibine dichloride, triphenylstibine oxide, tribenzylstibine, tri-α-naphthylstibine, trimethylstibine sulphate, bismuth triphenyl, bismuth tri-p-tolyl.

These compounds exert an excellent protective action and many other analogous substances will readily suggest themselves for use in our process, which aims at uniformly incorporating the same within the materials to be protected, so that they will be tenaciously and permanently retained therein.

Compounds in which the element of group V is in the trivalent state can be converted after the impregnation of the materials to be protected into compounds in which the element of group V is in the pentavalent state. This can be effected either by spontaneous oxidation in the air or by treatment with hydrogen peroxide or other suitable oxidation or substitution agents, as for example gaseous or dissolved halogens, preferably chlorine or bromine.

The process for the incorporation of the protective compounds into the materials to be protected is easy of execution and the following examples will serve to illustrate the invention.

*Example 1.*—Woolen material is immersed in a 3% solution of triphenylstibine in benzene. After thorough soaking the woolen material is withdrawn from the impregnating liquid, centrifuged and the solvent is then caused to evaporate either at ordinary or elevated temperature. The triphenylstibine is thus incorporated within the fibre in an extremely finely divided condition. After some time of exposure to the air the triphenylstibine is converted into triphenylstibine oxide by the action of the oxygen of the air. The triphenylstibine oxide is insoluble in benzene and possesses the great advantage of being insoluble in the customary solvents used for instance in washing and cleaning. The same effect is produced by a subsequent treatment of the impregnated material with chlorine gas or by immersion in a solution of chlorine or hydrogen peroxide or by treatment with bleaching powder.

*Example 2.*—Tri-tolylstibine is dissolved in benzene to form a solution and is sprayed on the material to be protected against moth, for example, skin, fur or the like, by means of spraying pistol. The further treatment of the material is effected as described in Example 1. A mixture of several of the aforementioned compounds may be used if desired.

*Example 3.*—In the same way one can use e. g. a two per cent aqueous solution of the sodium salt of phenylarsinic acid or a two per cent solution of triphenylphosphine dihydroxide in a mixture of alcohol and water. Such a solution can also be sprayed upon horsehair. Or felt is treated with a one per cent solution of diphenylstibine acetate in benzene and dried. In an analogous way wool can be immersed into a three per cent solution of a mixture of triethylbismuthbromide and diethylbismuthbromide in acetone. After pressing out the liquor it is washed with water and dried.

We claim:—

1. A process for protecting wool, furs and other materials against attack by moths, which comprises depositing in or upon the material to be protected a moth-repelling organic compound of an element of group V of Mendelejeff's classification of the elements, said element having an atomic weight greater than 14 and being directly attached to carbon in the compound.

2. A process for protecting wool, furs and other materials against attack by moths, which comprises depositing in or upon the material to be protected a moth-repelling organic compound of an element of the group comprising phosphorus, arsenic, antimony and bismuth, said element being directly attached to carbon in the compound.

3. A process for protecting wool, furs and other materials against attack by moths, which comprises depositing in or upon the material to be protected a moth-repelling organic compound of an element of the group comprising phosphorus, arsenic, antimony and bismuth, said element being directly attached to a carbon atom of at least one organic radical.

4. A process for protecting wool, furs and other materials against attack by moths, which comprises depositing in or upon the material to be protected a moth-repelling organic compound of an element of the group comprising phosphorus, arsenic, antimony and bismuth, said element being directly attached to carbon in the compound and being in the trivalent state.

5. A process for protecting wool, furs and other materials against attack by moths, which comprises depositing in or upon the material to be protected a moth-repelling organic compound of an element of the group comprising phosphorus, arsenic, antimony and bismuth, said element being directly attached to a carbon atom of at least one organic radical and being in the trivalent state.

6. A process for protecting wool, furs and other materials against attack by moths, which comprises depositing in or upon the material to be protected a moth-repelling organic compound of antimony wherein the antimony is directly attached to carbon in the compound.

7. A process for protecting wool, furs and other materials against attack by moths, which comprises depositing in or upon the material to be protected a moth-repelling organic compound of antimony wherein the antimony is directly attached to a carbon atom of at least one organic radical.

8. A process for protecting wool, furs and other materials against attack by moths, which comprises depositing in or upon the material to be protected a moth-repelling organic compound of antimony wherein the antimony is directly attached to a carbon atom of at least one aromatic radical.

9. A process for protecting wool, furs and other materials against attack by moths, which comprises depositing in or upon the material to be protected a moth-repelling organic compound of antimony wherein the antimony is directly attached to carbon in the compound and is in the trivalent state.

10. A process for protecting wool, furs and other materials against attack by moths, which comprises depositing in or upon the material to be protected a triaryl stibine compound.

11. A process for protecting wool, furs and other materials against attack by moths, which comprises depositing in or upon the material to be protected a triphenyl stibine compound.

12. A process for protecting wool, furs and other materials against attack by moths, which comprises depositing in or upon the material to be protected a moth-repelling organic compound of an element of the group comprising phosphorus, arsenic, antimony and bismuth, said element being directly attached to carbon in the compound and being in the trivalent state, and thereafter subjecting the material to the action of an oxidizing agent.

13. A process for protecting wool, furs and other materials against attack by moths, which comprises depositing in or upon the material to be protected a moth-repelling organic compound of antimony wherein the antimony is directly attached to carbon in the compound and is in the trivalent state, and thereafter subjecting the material to the action of an oxidizing agent.

14. A process for protecting wool, furs and other materials against attack by moths, which comprises depositing in or upon the material to be protected a moth-repelling organic compound of antimony wherein the antimony is directly attached to carbon in the compound and is in the trivalent state and thereafter subjecting the material to the action of an agent containing active chlorine.

15. A process for protecting wool, furs and other materials against attack by moths, which comprises depositing in or upon the material to be protected a moth-repelling organic compound of antimony wherein the antimony is directly attached to carbon in the compound and is in the trivalent state, and thereafter subjecting the material to the action of chlorine.

16. A process for protecting wool, furs and other materials against attack by moths, which comprises depositing in or upon the material to be protected triphenylstibine, and thereafter subjecting the material to the action of an oxidizing agent.

17. Material liable to attack by moths having incorporated therein or combined therewith a moth-repelling organic compound of an element of group V of Mendelejeff's classification of the elements, said element having an atomic weight greater than 14 and being directly attached to carbon in the compound.

18. Material liable to attack by moths having incorporated therein or combined therewith a moth-repelling organic compound of an element of the group comprising phosphorus, arsenic, antimony and bismuth, said element being directly attached to carbon in the compound.

19. Material liable to attack by moths having incorporated therein or combined therewith a moth-repelling organic compound of an element of the group comprising phosphorus, arsenic, antimony and bismuth, said element being directly attached to carbon in the compound and being in the trivalent state.

20. Material liable to attack by moths having incorporated therein or combined therewith a moth-repelling organic compound of antimony wherein the antimony is directly attached to carbon in the compound.

21. Material liable to attack by moths having incorporated therein or combined therewith a moth-repelling organic compound of antimony wherein the antimony is directly attached to carbon in the compound and is in the trivalent state.

22. Material liable to attack by moths having incorporated therein or combined therewith a triaryl stibine compound.

23. Material liable to attack by moths having incorporated therein or combined therewith a triphenyl stibine oxide.

In testimony whereof, we affix our signatures.

FRICH HARTMANN.
MAX HARDTMANN.
PAUL KUMMEL.